United States Patent
Kubo

(10) Patent No.: US 9,975,382 B2
(45) Date of Patent: May 22, 2018

(54) PNEUMATIC TIRE FOR MOTORCYCLE

(71) Applicant: BRIDGESTONE CORPORATION, Tokyo (JP)

(72) Inventor: Yukihiko Kubo, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 540 days.

(21) Appl. No.: 14/412,517

(22) PCT Filed: Aug. 8, 2013

(86) PCT No.: PCT/JP2013/004795
§ 371 (c)(1),
(2) Date: Jan. 2, 2015

(87) PCT Pub. No.: WO2014/024499
PCT Pub. Date: Feb. 13, 2014

(65) Prior Publication Data
US 2015/0122393 A1 May 7, 2015

(30) Foreign Application Priority Data
Aug. 8, 2012 (JP) ................................ 2012-176294

(51) Int. Cl.
*B60C 9/28* (2006.01)
*B60C 1/00* (2006.01)
(Continued)

(52) U.S. Cl.
CPC .............. *B60C 9/28* (2013.01); *B60C 1/0016* (2013.01); *B60C 9/005* (2013.01); *B60C 9/08* (2013.01);
(Continued)

(58) Field of Classification Search
CPC ........... B60C 9/28; B60C 1/0016; B60C 9/08; B60C 9/005; B60C 9/20; B60C 9/00
See application file for complete search history.

(56) References Cited

U.S. PATENT DOCUMENTS 4,073,330 A * 2/1978 Allard .................. B60C 9/0028
152/530
4,172,487 A * 10/1979 Suzuki .................. B60C 9/2009
152/527
(Continued)

FOREIGN PATENT DOCUMENTS

CN 1675078 A 9/2005
CN 102264554 A 11/2011
(Continued)

OTHER PUBLICATIONS

International Search Report for PCT/JP2013/004795 dated Nov. 12, 2013.

*Primary Examiner* — Jacob T Minskey
*Assistant Examiner* — Melody Tsui
(74) *Attorney, Agent, or Firm* — Sughrue Mion, PLLC

(57) ABSTRACT

The present invention aims at providing a pneumatic tire for a motorcycle, capable of improving steering stability and wear resistance in a turning situation with maintaining good turning performance achieved by a relatively wide auxiliary belt layer. Specifically, the present invention provides a pneumatic tire for a motorcycle, characterized in that: the auxiliary belt layer is sectioned into a middle area Am overlapping a region where the belt layer is provided and respective side areas As each extending beyond the region where the belt layer is provided; the cords in the middle area Am extend at an inclination angle θm in the range of 70° to 90° with respect to the tire circumferential direction; and the cords in each side area As extend, in at least a portion of the side area, at an inclination angle θs different from the inclination angle θm with respect to the tire circumferential direction.

7 Claims, 3 Drawing Sheets

(51) Int. Cl.
*B60C 9/20* (2006.01)
*B60C 9/08* (2006.01)
*B60C 9/00* (2006.01)
B60C 9/18 (2006.01)

(52) U.S. Cl.
CPC ............. *B60C 9/20* (2013.01); *B60C 9/2009* (2013.01); *B60C 2009/1871* (2013.01); *B60C 2009/2022* (2013.01); *B60C 2009/2025* (2013.01); *B60C 2200/10* (2013.01)

(56) References Cited

U.S. PATENT DOCUMENTS

| | | | |
|---|---|---|---|
| 5,400,847 A | * | 3/1995 | Suzuki .................. B60C 9/2009 152/526 |
| 2005/0217783 A1 | | 10/2005 | Valle et al. |

FOREIGN PATENT DOCUMENTS

| | | | | |
|---|---|---|---|---|
| JP | 1-240306 A | | 9/1989 | |
| JP | 09-226317 A | | 9/1997 | |
| JP | 2005-231529 A | | 9/2005 | |
| JP | 2008-087627 A | | 4/2008 | |
| JP | 2009-051360 A | | 3/2009 | |
| JP | 2009-90833 A | | 4/2009 | |
| JP | 2009-126422 A | | 6/2009 | |
| JP | 2010-126003 A | | 6/2010 | |
| JP | 2010-126005 A | | 6/2010 | |
| JP | 2010120613 A | * | 6/2010 | ........... B60C 9/2204 |
| WO | 2008/075737 A1 | | 6/2008 | |
| WO | 2010/058603 A1 | | 5/2010 | |

\* cited by examiner

PNEUMATIC TIRE FOR MOTORCYCLE

CROSS REFERENCE TO RELATED APPLICATIONS

This application is a National Stage of International Application No. PCT/JP2013/004795 filed Aug. 8, 2013, claiming priority based on Japanese Patent Application No. 2012-176294, filed Aug. 8, 2012, the contents of all of which are incorporated herein by reference in their entirety.

TECHNICAL FIELD

The present invention relates to a pneumatic tire for a motorcycle, having: a radial carcass constituted of at least one carcass ply formed by a plurality of cords extending at an inclination angle in the range of 70° to 90° with respect to the tire circumferential direction; a belt layer having cords and provided on the outer peripheral side of a crown region of the radial carcass; a single auxiliary belt layer constituted of a plurality of cords and provided on the outer peripheral side of the belt layer; and a tread rubber provided on the outer peripheral side of the auxiliary belt layer to form a tread ground-contact surface, and in particular a pneumatic tire for a motorcycle as described above having a periphery width of the auxiliary belt layer larger than a periphery width of the belt layer.

BACKGROUND ART

Examples of such a pneumatic tire for a motorcycle as described above include a motorcycle pneumatic tire disclosed in PTL 1.
The motorcycle pneumatic tire disclosed in PTL 1 characteristically has an average value for the total gauge of the tire in a region of a tread portion where a spiral belt layer is arranged on the inner side in the tire radial direction of the tread portion smaller than an average value for the total gauge of the tire in a region of the tread portion where the spiral belt layer is not arranged, so that the motorcycle pneumatic tire has higher steering stability during high-speed traveling, as well as improved traction performance during acceleration from tight cornering wherein a vehicle (motorcycle) is largely tilted and improved stability during the body tilting.

CITATION LIST

Patent Literature

PTL 1: JP2010-126005

SUMMARY OF THE INVENTION

Technical Problems

The motorcycle pneumatic tire of PTL 1, by the way, has a periphery width of an auxiliary belt layer thereof wider than a periphery width of the (spiral) belt layer provided on the inner peripheral side of the auxiliary belt layer, thereby presumably causing good effects that: the auxiliary belt layer constituted of a plurality of cords extending at an inclination angle in the range of 70° to 90° with respect to the tire equatorial plane reduces shear deformation in the circumferential direction of tread rubber, to improve wear resistance of the tire; and the relatively narrow belt layer made of cords and the like extending in the tire circumferential direction and having high rigidity increases a ground-contact area of a tread ground-contact surface when the tire is making a high bank angle turn with respect to a road surface, so that the tire can exhibit excellent turning performances in terms of cornering force, road surface grip, and the like.

However, in this case, there emerges a significantly large difference in rigidity between a middle area of the auxiliary belt layer, overlapping a region where the belt layer is provided, and respective side areas of the auxiliary belt layer each beyond the region where the belt layer is provided because the belt layer constituted of, e.g. cords extending substantially in the tire circumferential direction, does not exist on the inner peripheral side of the side areas of the auxiliary belt layer. As a result, there arise problems in that: so good steering stability as expected cannot be obtained in a cornering situation in which the tire is highly tilted with a large camber angle; and a tread shoulder region brought into contact with a road surface in the cornering situation slips to cause partial wear of the tread shoulder region.

The present invention aims at solving the aforementioned problems of the conventional motorcycle pneumatic tire having a periphery width of an auxiliary belt layer wider than a periphery width of a belt layer provided on the inner peripheral side of the auxiliary belt layer and an object thereof is to provide a pneumatic tire for a motorcycle, capable of significantly improving steering stability and wear resistance in a turning or cornering situation with maintaining good turning performance achieved by an auxiliary belt layer wider than a belt layer.

Solution to the Problems

The pneumatic tire for a motorcycle of the present invention, having: a radial carcass constituted of at least one carcass ply formed by a plurality of cords extending at an inclination angle in the range of 70° to 90° with respect to the tire circumferential direction; a belt layer having cords and provided on the outer peripheral side of a crown region of the radial carcass; a single auxiliary belt layer constituted of a plurality of cords and provided on the outer peripheral side of the belt layer; and a tread rubber provided on the outer peripheral side of the auxiliary belt layer to form a tread ground-contact surface, wherein a periphery width of the auxiliary belt layer is larger than a periphery width of the belt layer, characterized in that: the auxiliary belt layer is sectioned into a middle area overlapping a region where the belt layer on the inner peripheral side of the auxiliary belt is provided and respective side areas each extending beyond the region where the belt layer is provided; the cords of the auxiliary belt layer in the middle area thereof extend at a constant inclination angle in the range of 70° to 90° with respect to the tire circumferential direction; and the cords of the auxiliary belt layer in each side area thereof extend, in at least a portion of the side area, at an inclination angle different from the inclination angle of the cords in the middle area with respect to the tire circumferential direction.

In the present invention, a "periphery width" represents a length of a tread ground-contact surface/a belt layer/an auxiliary belt layer, measured along a contour configuration of the tread ground-contact surface/the belt layer/the auxiliary belt layer in a cross section of a tire in the width direction thereof in a state where the tire has been assembled with a prescribed rim and inflated at prescribed internal pressure with no load exerted thereon. Further, an angle formed by cords constituting a carcass ply, a belt layer, an auxiliary belt layer and the like, with respect to the tire circumferential direction, is also measured in a state where the tire has been assembled with a prescribed rim and inflated at prescribed internal pressure with no load exerted thereon in the present invention.

In the present invention, a "prescribed rim" represents either a standard rim prescribed by the following standards in accordance with a tire size or "Design Rim" or "Measuring Rim". "Prescribed internal pressure" represents air pressure prescribed corresponding to the maximum loading capacity of a tire. "The maximum loading capacity" represents the maximum load which the following standards allow a tire to carry. The "standard" represents an industrial standard which is valid in a region where a tire is manufactured or used and examples thereof include "YEAR BOOK" of the Tire and Rim Association Inc. in the United States, "STANDARDS MANUAL" of the European Tyre and Rim Technical Organisation in Europe, and "JATMA YEAR BOOK" of Japan Automobile Tyre Manufacturers Association in Japan.

Advantageous Effect of the Invention

According to the pneumatic tire for a motorcycle of the present invention, the cords of the auxiliary belt layer in the middle area thereof extend at a constant inclination angle in the range of 70° to 90° with respect to the tire circumferential direction and the cords of the auxiliary belt layer in each side area thereof extend, in at least a portion of the side area, at an inclination angle different from the inclination angle of the cords in the middle area with respect to the tire circumferential direction. Due to this, an extending direction of the cords of the auxiliary belt layer in each side area thereof extending at an inclination angle different from the inclination angle of the cords of the auxiliary belt layer in the middle area thereof with respect to the tire circumferential direction can resemble a direction of a resultant force resulting from a force inputted in the front-rear direction of the motorcycle by the action of driving force thereof and a force inputted in the lateral direction of the motorcycle by the action of centrifugal force in a cornering situation, whereby the cords of the auxiliary belt layer in the side area thereof can reliably exhibit high rigidity against the resultant force. As a result, sharp difference in rigidity between the middle area and each side area of the auxiliary belt layer, resulted from presence/absence of the belt layer on the inner peripheral side thereof, is mitigated, thereby enhancing steering stability and suppressing occurrence of a slip in a cornering situation to improve wear resistance of the tire, with maintaining good turning performance achieved by the auxiliary belt layer wider than the belt layer.

DESCRIPTION OF THE EMBODIMENTS

Figure 1:
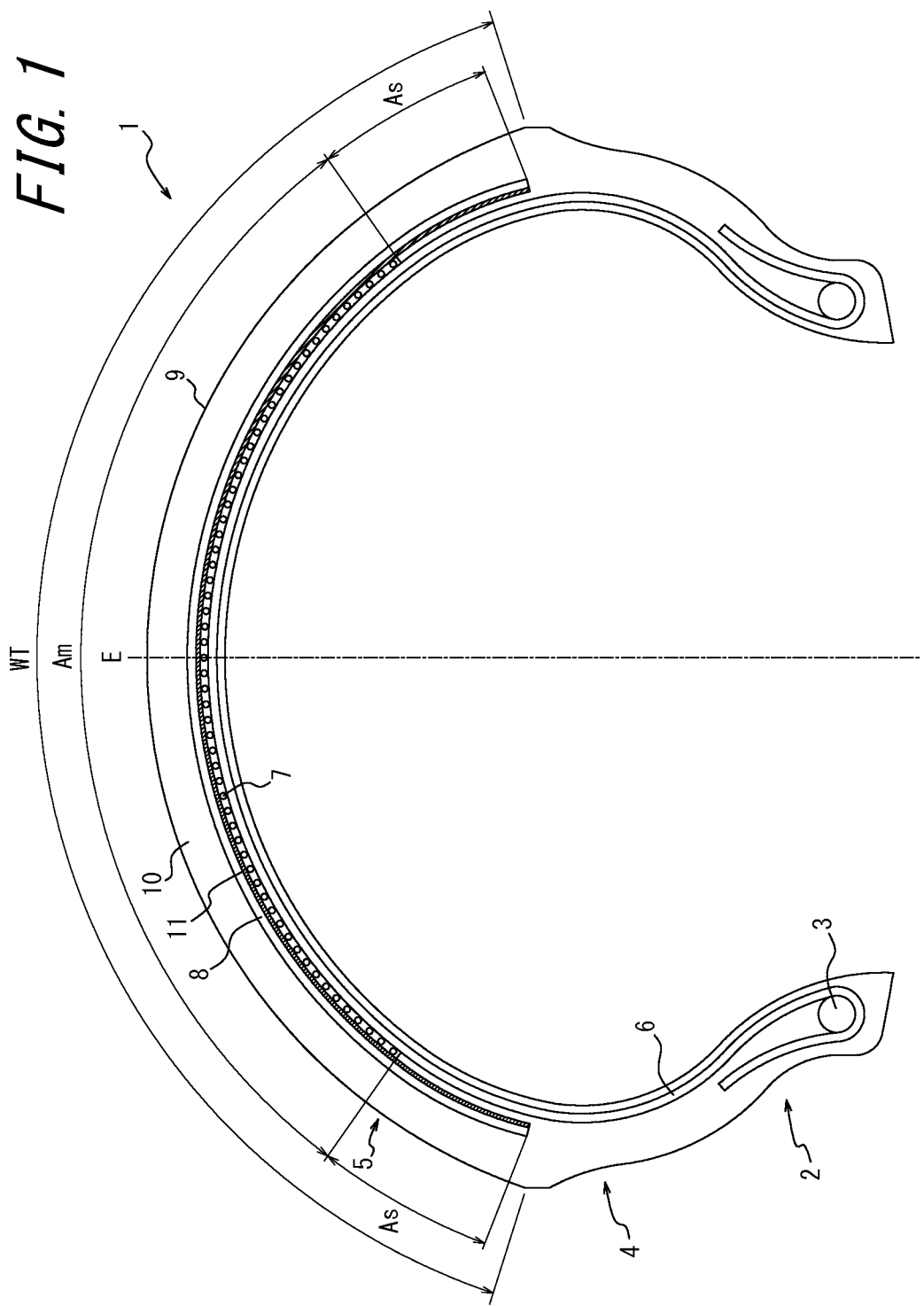
FIG. 1 is a cross sectional view in the tire width direction showing one embodiment of a pneumatic tire for a motorcycle of the present invention.

An embodiment of the present invention will be demonstratively described with reference to the drawings hereinafter. A pneumatic tire 1 for a motorcycle exemplarily shown in FIG. 1 has: bead cores 3 respectively embedded in a pair of bead portions 2; a radial carcass 6 constituted of at least one carcass ply (a single carcass ply in FIG. 1) provided across the respective bead portions 2 via sidewall portions 4 and a tread portion 5; a belt layer 7 provided on the outer peripheral side of a crown region of the radial carcass 6, i.e. on the outer side in the tire radial direction of the radial carcass 6; an auxiliary belt layer 8 provided on the outer peripheral side of the belt layer 7; and a tread rubber 10 provided on the outer peripheral side of the auxiliary belt layer 8 to form a tread ground-contact surface 9.

In the present embodiment shown in FIG. 1, the carcass ply of the radial carcass 6 extending in a toroidal shape across the pair of the bead portions 2 and being folded up around the respective bead cores 3 may be constituted of a plurality of rubber-coated organic fiber/steel cords extending at an inclination angle in the range of 70° to 90° with respect to the tire circumferential direction in parallel to the tire equatorial plane E.

In a case where two or more carcass plies are provided as the radial carcass 6, cords constituting one carcass ply and cords constituting another carcass ply adjacent to the one carcass ply may intersect one another, with extending at an inclination angle in the aforementioned range with respect to the tire circumferential direction, respectively.

The belt layer 7, which may be a single belt layer, for example, and provided on the outer peripheral side of the radial carcass 6 can be formed preferably by spirally winding in the tire width direction a ribbon-like strip, made of rubber-coated one or more cords, to extend in the tire circumferential direction. In this case, the cords of the belt layer 7 extend substantially in the tire circumferential direction, e.g. at an inclination angle ≤5° with respect to the tire circumferential direction. The cords of the belt layer 7 are preferably steel cords in terms of successfully ensuring desired rigidity of the tread portion. It is not essential that the cords of the belt layer 7 extend in the tire circumferential direction and the cords of the belt layer 7 may extend at an inclination angle >5° with respect to the tire circumferential direction.

In a case where the belt layer 7 is constituted of cords extending in the tire circumferential direction, however, the belt layer 7 can ensure desired rigidity of the tread portion 5 if the number of the carcass plies is reduced in order to make the tire structure compact and reduce the tire weight.

Figure 2:
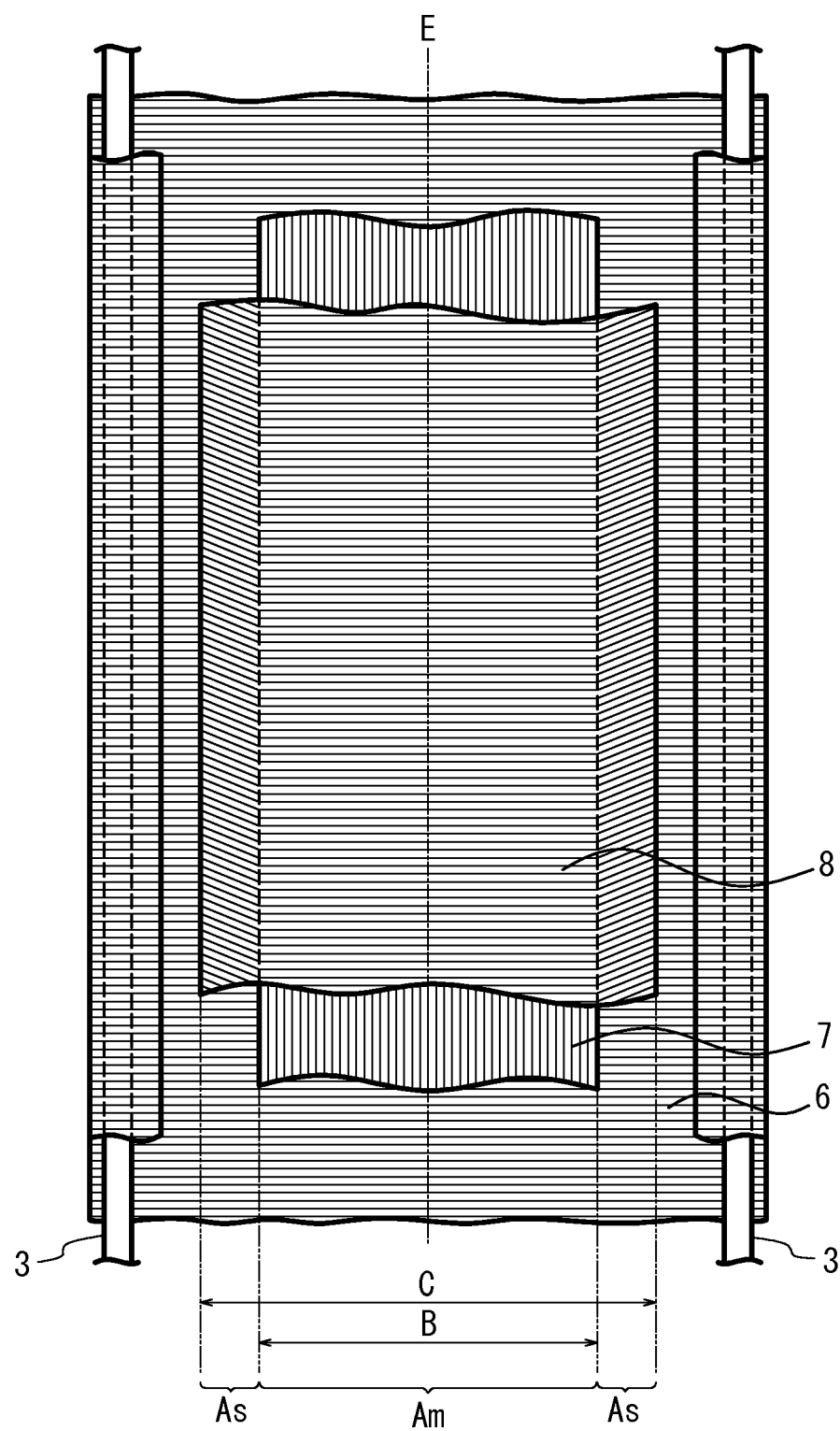
FIG. 2 is a partially developed plan view showing a reinforcement structure of the tire of FIG. 1.

In the tire 1 of the present embodiment, a periphery width C of the single auxiliary belt layer 8 provided on the outer peripheral side of the belt layer 7 is made larger than a periphery width B of the belt layer 7, as shown in the developed plan view of FIG. 2.

As a result, the relatively wide auxiliary belt layer 8 reduces in-plane shear deformation of the tread rubber 10 when the tire 1 is rotated with load exerted thereon, thereby successfully improving wear resistance of the tread ground-contact surface 9, and the relatively narrow belt layer 7 having high rigidity increases a ground-contact area of the tread when the tire is making a turn, thereby allowing the tire to demonstrate excellent turning performance. The belt layer 7 and the auxiliary belt layer 8 each align the center position in the width direction thereof at the tire equatorial plane E in the embodiment shown in FIG. 2.

However, in the case where a periphery width C of the single auxiliary belt layer 8 is made larger than a periphery width B of the belt layer 7 as described above, provided that the auxiliary belt layer 8 is sectioned into: a middle area Am overlapping a region where the belt layer 7 on the inner peripheral side of the auxiliary belt 8 is provided; and respective side areas As extending on the respective sides of the middle area Am each beyond the region where the belt layer 7 is provided, as shown by phantom lines in FIG. 2, there exists a large difference in rigidity between the middle area Am having the highly rigid belt layer 7 on the inner peripheral side thereof and each side area As not having the belt layer 7 on the inner peripheral side thereof.

Figure 3:
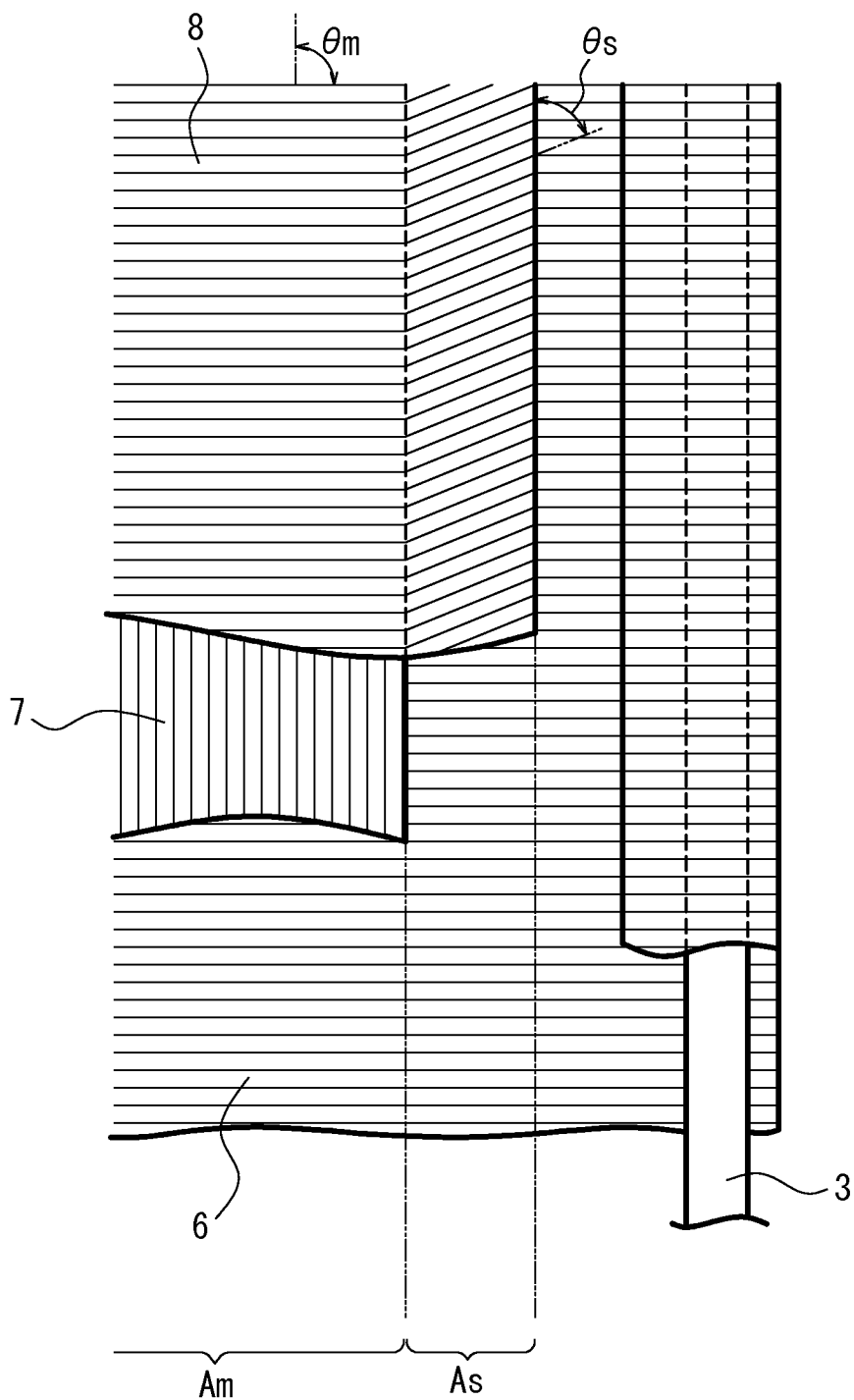
FIG. 3 is a developed plan view showing a main portion of FIG. 2 in an enlarged manner.

Such a difference in rigidity as described above deteriorates steering stability performance when a motorcycle is making a turn in which the motorcycle is highly tilted with a large camber angle imparted on a tire and facilitates slippage of a tread shoulder region of the tire in the turning situation, thereby possibly causing partial wear of the tread shoulder region. In order to address this problem, in the present invention, the cords of the auxiliary belt layer 8 in the middle area Am thereof linearly extend at a constant inclination angle θm in the range of 70° to 90° (90° in the example shown in FIG. 2) with respect to the tire circumferential direction; and the cords of the auxiliary belt layer 8 in each side area As thereof extend, in at least a portion of the side area As and preferably all across the side area As as shown in FIG. 2 and FIG. 3, at an inclination angle θs different from the inclination angle θm of the cords in the middle area Am with respect to the tire circumferential direction.

As a result, an extending direction of the cords of the auxiliary belt layer 8 in each side area As thereof resembles a direction of a resultant force resulting from a force inputted by driving force and a force inputted by centrifugal force, which force is exerted on the tread ground-contact surface in a turning or cornering situation, whereby the cords of the auxiliary belt layer 8 in the side area As thereof can exert high resisting force against the resultant force to significantly improve steering stability performance in the turning situation. Further, occurrence of a slip in a tread shoulder region of the tire in a turning situation is also prevented in this case, whereby wear resistance performance of the tire is also improved.

Deference between the angle θm formed by the cords of the middle area Am with respect to the tire circumferential direction and the angle θs formed by the cords of each side area As with respect to the tire circumferential direction is preferably in the range of 5° to 30°. Adequately rigid sensation can be felt by a rider by setting the difference between the two angles to be in the aforementioned range because the cords of each side area As are then disposed in a direction aligned with a direction of a force inputted to the tire in a high bank angle turning situation. In other words, in a case where the difference between the cord inclination angle θs in each side area As and the cord inclination angle θm in the middle area Am is less than 5°, satisfactorily rigid sensation cannot be felt by a rider because an angle formed by the cords of the side area As with respect to the direction of the force inputted to the tire 1 is too small. On the other hand, in a case where the aforementioned difference between the two cords inclination angles is larger than 30°, the angle formed by the cords of the side area As with respect to the direction of the force inputted to the tire 1 is too large, whereby strain is excessively generated in the cords of the side area As to possibly deteriorate durability performance of the tire.

The inclination angle θs formed by the cords of each side area As with respect to the tire circumferential direction may be selected from the range of, e.g. 75° to 85°, as long as the inclination angle θs is different from the inclination angle θm of the cords in the middle area Am.

It suffices for the cords of each side area As to extend, in at least a portion of the side area As, at an inclination angle θs different from the inclination angle θm of the cords in the middle area Am with respect to the tire circumferential direction. In a case where the cords of the side area As curve while they extend, it suffices for an angle formed by a tangent line at a point on the curved portion with respect to the tire circumferential direction to be different from the inclination angle θm of the cords in the middle area Am in a developed view as shown in FIG. 2.

The cords of the auxiliary belt layer 8 in each side area As thereof preferably extend in a direction intersecting the cords of the carcass ply provided to be adjacent to the side area As on the inner peripheral side of the side area in order to more effectively prevent deterioration of rigidity in the side area As due to lack of the belt layer 7 thereunder. Specifically, the cords of each side area As preferably extend in a direction intersecting ply cords extending at an inclination angle in the range of 70° to 90° with respect to the tire circumferential direction, of the radial carcass 6, as shown in FIG. 2 and FIG. 3, such that the cords of the auxiliary belt layer 8 in the side area As thereof and the ply cords adjacent to these cords on the inner peripheral side thereof form an intersecting reinforcement structure. Formation of the intersecting reinforcement structure further reduces or mitigates the difference in rigidity between each side area As and the middle area Am of the auxiliary belt layer 8 to enhance road surface gripping force and more effectively suppresses deterioration of wear resistance performance due to slippage of the tread ground-contact surface 9 in a cornering or turning situation. In a case where the radial carcass is constituted of a plurality of carcass plies, the cords of each side area As preferably extend in a direction intersecting the ply cords of the outermost (the closest) carcass ply among the carcass plies adjacent to the side area As and more preferably extend in a direction intersecting ply cords of every carcass ply of the plurality of the carcass plies.

The ply cords of the carcass ply provided to be adjacent to each side area As on the inner peripheral side thereof extend at an inclination angle of substantially 90° with respect to the tire circumferential direction in the embodiment shown in FIG. 2 and FIG. 3. In a case where these ply cords extend at an inclination angle smaller than 90° with respect to the tire circumferential direction, it is preferable that the cords of the side area As extend in a direction opposite, with respect to the tire width direction, to the ply cord extending direction. Such an arrangement as described above further reduces or mitigates difference in rigidity between each side area As and the middle area Am of the auxiliary belt layer 8, thereby further successfully improving steering stability performance and wear resistance performance of the tire in a turning situation.

The cords of the respective side areas As extending on the respective sides of the middle area Am of the auxiliary belt layer 8 may extend such that the outermost ends in the tire width direction of the cords of the both side areas As are oriented toward the same side in the tire circumferential direction (the upper side in FIGS. 2 and 3), as shown in FIG. 2, in the present invention. Alternatively, although not shown in the drawings, the cords of the respective side areas As may extend such that the outermost ends in the tire width direction of the cords of one side area As are oriented opposite to the outermost ends in the tire width direction of the cords of the other side area As in the tire circumferential direction.

It is preferable to use organic fiber cords for the cords of the belt layer 7, as well as the cords of the radial carcass 6 and the auxiliary belt layer 8 interposing the belt layer therebetween, in terms of making the tire structure compact and reducing the tire weight.

However, it is also preferable to use steel cords for the cords constituting the belt layer 7 and use organic fiber cords for the cords constituting the radial carcass 6 and the cords constituting the auxiliary belt layer 8, respectively, in terms of significantly enhancing out-of-plane bending rigidity in a cross section in the width direction and reducing the tire weight.

In the tire 1, the relationship between a periphery width B of the belt layer 7 and a periphery width WT of the tread ground-contact surface 9 is preferably $0.5 \leq B/WT \leq 0.9$ and more preferably $0.6 \leq B/WT \leq 0.8$; and the relationship between a periphery width C of the auxiliary belt layer 8 and a periphery width B of the belt layer 7 is preferably $1.0 < C/B \leq 2.0$ and more preferably $1.1 \leq C/B \leq 1.5$, in terms of further improving the aforementioned excellent turning performance including satisfactory cornering force and road surface gripping force, as well as good wear resistance performance.

It is possible to make the tire demonstrate excellent turning performance including satisfactory cornering force and road surface gripping force by setting a periphery width B of the belt layer 7 and a periphery width WT of the tread ground-contact surface 9 to satisfy the relationship formula: $0.5 \leq B/WT \leq 0.9$ because then the highly rigid belt layer 7 exists all across the desired range of the tread portion 5 in a cross section of the tire in the width direction thereof. In other words, $B/WT<0.5$ makes the belt layer 7 too narrow, thereby decreasing lateral force exerted in a turning or cornering situation to possibly deteriorate turning performance of the tire. $B/WT>0.9$ makes the highly rigid belt layer 7 too wide relative to the tread ground-contact surface 9, thereby decreasing a ground contact area to possibly result in unsatisfactory improvement of turning performance.

Further, it is possible to make the tire demonstrate excellent turning performance by setting a periphery width C of the auxiliary belt layer 8 and a periphery width B of the belt layer 7 to satisfy the relationship formula: $1.0 < C/B \leq 2.0$. In other words, $C/B \leq 1.0$ makes the highly rigid belt layer 7 too wide to decrease a ground contact area of the tread ground-contact surface 9 exceedingly, thereby resulting in failure in obtaining turning performance as desired. $C/B>2.0$ causes the auxiliary belt layer 8 to exist over a too wide range in the tire width direction with respect to the belt layer 7, which increases rigidity of the tire 1 too much to possibly result in failure in improving turning performance as desired.

A cushion rubber layer 11 for absorbing shear deformation in the tire circumferential direction of the tread rubber to prevent occurrence of a localized "slip area" in a ground contact surface is preferably provided between the auxiliary belt layer 8 and the belt layer 7, as shown in FIG. 1. Wear resistance performance of the tire can be further improved by provision of the cushion rubber layer 11.
The cushion rubber layer 11 preferably has thickness in the range of 0.3 mm to 1.5 mm when the thickness is measured along a line normal to a surface of the cushion rubber layer 11 in a state where the tire has been assembled with a prescribed rim and inflated at the prescribed internal pressure with no load exerted thereon. The cushion rubber layer 11 having thickness less than 0.3 mm cannot absorb shear deformation in the tire circumferential direction effectively. The cushion rubber layer 11 having thickness larger than 1.5 mm generates too much heat when it is deformed, thereby possibly failing to ensure durability performance as desired of the tire.

The cushion rubber layer 11 may be formed by rubber having relatively low elasticity, e.g. rubber having hardness similar to those of coating rubbers of the belt layer 7 and the auxiliary belt layer 8 adjacent to the cushion rubber layer 11.

The tire 1 as described above is suitably used for a rear tire in particular subjected to large driving force, of a motorcycle.

EXAMPLES

Next, test tires of the pneumatic tire for a motorcycle of the present invention were prepared and performances of these test tires were evaluated as described below. The test tires had tire size: 120/70ZR17 for front tires and tire size: 180/55ZR17 for rear tires.

Example 1 (test) tire had a structure as shown in FIGS. 1 to 3. The details of the relevant characteristics of Example 1 tire are shown in Table 1. Example 2, 3, 7 tires each had a structure similar to that of Example 1 tire, except that the cord inclination angle in each side area As of each of Example 2, 3, 7 tires was made different from that of Example 1 tire, as shown in Table 1. Example 4, 5 tires each had a structure similar to that of Example 3 tire, except that the values of B/WT of Example 4, 5 tires were changed from that of Example 3 tire. Example 6 tire had a structure similar to that of Example 5 tire, except that the value of C/B of Example 6 tire was changed from that of Example 5 tire.

On the other hand, Comparative Example tire had a structure similar to that of Example 1 tire, except that the cord inclination angle in each side area As was made equal to the cord inclination angle in the middle area Am, i.e. 90°, in the former. In Table 1, every "angle" of cords represents an inclination angle with respect to the tread circumferential direction.

Each of these test tires was mounted on a motorcycle and grip performance and sensation of rigidity were evaluated based on how a driver felt. The results are shown in Table 1. The grip performance and sensation of rigidity shown in Table 1 are each expressed as an index value relative to the corresponding value of Comparative Example tire as the control. The larger index value represents the better performance. Further, wear resistance performance was evaluated by a remaining depth of a groove as a gauge formed in a tread surface of the tire after the motorcycle ran. The measurement results of wear resistance performance are also shown in Table 1 as index values relative to the corresponding value of Comparative Example tire as the control. The larger index value represents the better wear resistance performance in Table 1 in this regard.

TABLE 1

|  | Comp. Example tire | Example 1 tire | Example 2 tire | Example 3 tire | Example 4 tire | Example 5 tire | Example 6 tire | Example 7 tire |
|---|---|---|---|---|---|---|---|---|
| Angle of ply cord (°) | 80 | 80 | 80 | 80 | 80 | 80 | 80 | 80 |
| Cord angle θm (°) of middle area Am | 90 | 90 | 90 | 90 | 90 | 90 | 90 | 90 |

TABLE 1-continued

|  |  | Comp. Example tire | Example 1 tire | Example 2 tire | Example 3 tire | Example 4 tire | Example 5 tire | Example 6 tire | Example 7 tire |
|---|---|---|---|---|---|---|---|---|---|
| Cord angle θs (°) of side area As |  | 90 | 80 | 88 | 45 | 45 | 45 | 45 | 70 |
| B/WT |  |  | 0.75 | 0.75 | 0.75 | 0.75 | 0.9 | 1.1 | 1.1 | 0.75 |
| C/B |  | 1.3 | 1.3 | 1.3 | 1.3 | 1.3 | 1.3 | 1.5 | 1.3 |
| Results | Gripping performance (index) | 100 | 140 | 125 | 120 | 110 | 105 | 100 | 135 |
|  | Wear resistance (index) | 100 | 140 | 125 | 120 | 110 | 105 | 100 | 135 |
|  | Sensation of rigidity (index) | 100 | 120 | 110 | 130 | 135 | 140 | 145 | 125 |

It is clearly understood from the results shown in Table 1 that Example 1-7 tires, in each of which the cord inclination angle θs in each side area As thereof was made different from the cord inclination angle θm in the middle area Am, unanimously exhibit improvements at least in sensation of rigidity, as compared with Comparative Example tire in which the cord inclination angle θs was made equal to the cord inclination angle θm.

Further, it is understood that Example 1, 7 tires, in each of which difference in cord inclination angle between the side area As and the middle area Am remained within the range of 5° to 30°, demonstrate better grip performance and better wear resistance than Example 2-6 tires not satisfying the requirement.

Yet further, Example 4 tire, having B/WT=0.9 (i.e. satisfying the relationship: 0.5≤B/WT≤0.9), obviously demonstrates better grip performance and better wear resistance than Example 5, 6 tires having B/WT=1.1 not satisfying the requirement.

It should be noted, however, that Example 5 tire having C/B=1.3 exhibits better grip performance and better wear resistance than Example 6 tire having C/B=1.5.

From the facts described above, it is understood that the pneumatic tire for a motorcycle of the present invention can significantly improve steering stability performance and wear resistance performance in a turning or cornering situation, with maintaining good turning performance thereof.

REFERENCE SIGNS LIST

1 Pneumatic tire for Motorcycle
2 Bead portion
3 Bead core
4 Sidewall portion
5 Tread portion
6 Radial carcass
7 Belt layer
8 Auxiliary belt layer
9 Tread ground-contact surface
10 Tread rubber
11 Cushion rubber layer
E Tire equatorial plane
Am Middle area of Auxiliary belt layer
As Side area of Auxiliary belt layer
WT Periphery width of Tread ground-contact surface
B Periphery width of Belt layer
C Periphery width of Auxiliary belt layer
θm Cord inclination angle in Middle area
θs Cord inclination angle in Side area

The invention claimed is:

1. A pneumatic tire for a motorcycle, having: a radial carcass constituted of at least one carcass ply formed by a plurality of cords extending at an inclination angle in the range of 70° to 90° with respect to the tire circumferential direction; a belt layer having cords and provided on the outer peripheral side of a crown region of the radial carcass; a single auxiliary belt layer constituted of a plurality of cords and provided on the outer peripheral side of the belt layer; and a tread rubber provided on the outer peripheral side of the auxiliary belt layer to form a tread ground-contact surface, wherein a periphery width of the auxiliary belt layer is larger than a periphery width of the belt layer, wherein:

the auxiliary belt layer is sectioned into a middle area overlapping a region where the belt layer on the inner peripheral side of the auxiliary belt is provided and respective side areas each extending beyond the region where the belt layer is provided;

the cords of the auxiliary belt layer in the middle area thereof extend at a constant inclination angle in the range of ≥70° and <80° with respect to the tire circumferential direction;

the cords of the auxiliary belt layer in each side area thereof extend, in at least a portion of the side area, at an inclination angle different from the inclination angle of the cords in the middle area with respect to the tire circumferential direction;

the middle area and the respective side areas of the auxiliary belt layer are integral with each other to constitute the single auxiliary belt layer;

wherein difference between the angle formed by the cords of each side area with respect to the tire circumferential direction and the angle formed by the cords of the middle area with respect to the tire circumferential direction is in the range of 5° to 30°; and wherein the belt layer is constituted of cords extending in the tire circumferential direction.

2. The pneumatic tire for a motorcycle of claim 1, wherein a periphery width B of the belt layer and a periphery width WT of the tread ground-contact surface satisfies a relationship: 0.5≤B/WT≤0.9.

3. The pneumatic tire for a motorcycle of claim 1, wherein a periphery width C of the auxiliary belt layer and a periphery width B of the belt layer satisfies a relationship: 1.0<C/B≤2.0.

4. The pneumatic tire for a motorcycle of claim 1, wherein the cords of the auxiliary belt layer in each side area thereof extend in a direction intersecting the cords of the carcass ply provided to be adjacent to the side area on the inner peripheral side of the side area.

5. The pneumatic tire for a motorcycle of claim 4, wherein the cords of the auxiliary belt layer in each side area thereof extend in a direction opposite, with respect to the tire width direction, to the cords of the carcass ply provided to be adjacent to the side area on the inner peripheral side of the side area.

6. The pneumatic tire for a motorcycle of claim 1, wherein the cords constituting the belt layer are steel cords, and the cords constituting the radial carcass and the cords constituting the auxiliary belt layer are both organic fiber cords in a state where the radial carcass and the auxiliary belt layer interpose the belt layer therebetween.

7. The pneumatic tire for a motorcycle of claim 1, wherein a cushion rubber layer is provided between the auxiliary belt layer and the belt layer.

\* \* \* \* \*